US000001057H

United States Statutory Invention Registration [19]

[11] Reg. Number: H1057

[43] Published: May 5, 1992

Regalia et al.

[54] CONDUCTIVE HOSE

[76] Inventors: Floyd W. Regalia, 4701 Kenmore Ave., #205, Alex, Va. 22304; Earl H. Bonafede, 3537 Pepper Ridge Dr., Mobile, Ala. 36693

[21] Appl. No.: 532,905

[22] Filed: May 31, 1990

[51] Int. Cl.[5] ..... F16L 11/12; H01B 7/00; H01B 17/00

[52] U.S. Cl. ..... 174/47; 138/103; 340/320

[58] Field of Search ..... 174/47; 138/103; 340/320; 361/215

[56] References Cited

U.S. PATENT DOCUMENTS

| | | | |
|---|---|---|---|
| 1,901,330 | 3/1933 | Poberejsky | 361/215 X |
| 2,103,758 | 12/1937 | Seyfried | 174/47 X |
| 3,042,737 | 7/1962 | Brumbach et al. | 174/47 |
| 3,457,359 | 7/1969 | Soucy | 174/47 |
| 3,828,112 | 8/1974 | Johansen et al. | 174/47 |
| 4,215,384 | 7/1980 | Elson | 174/47 |

FOREIGN PATENT DOCUMENTS

| | | | |
|---|---|---|---|
| 264959 | 2/1927 | United Kingdom | 174/47 |

*Primary Examiner*—Bernarr E. Gregory

[57] ABSTRACT

A firehose is constructed comprising a hose containing a conductive material throughout the length of the hose with a coupling at both ends of the hose, the coupling being electrically attached to the conductive material.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONDUCTIVE HOSE

BACKGROUND OF THE INVENTION

1. Field of the Invention

This invention relates generally to hoses and in particular to conductive hoses.

2. Description of the Prior Art

Given the well known fact that water and electricity do not mix, firefighters who find themselves in a position where they have to use water on an electrical fire, either by choice or by accident, are in very real danger of sustaining a severe if not lethal electrical shock using present equipment.

Although there are alternate methods to fight electrical fires, such as $CO_2$, and HALON, none is as effective or as readily available as water. Yet even 120 volts, which is the most common voltage aboard ship or shore installations, can be lethal. A firefighter entering a smoke-filled room or compartment may not even know he is near or in contact with deadly electrical shock hazard.

Research conducted by Underwriters Laboratories, Inc. and cited in the Fire Chief's Handbook, indicates that the maximum continuous current to which an individual can be safely subjected is five milliamps (5 mA) and that there is a definite relationship between the length of exposure to electric shock and the effect of that shock. Many authorities consider that a current of 50 mA passing through the human body is the approximate lower limit likely to cause fatalities. In tests conducted at Purdue University and referenced in the Handbook, the effects of various 60 cycle currents are estimated where the resistance of the human body was assumed to be 5,000 ohms. A current of 1 mA will just be felt; 4 to 10 mA will cause a sense of pain; 30 mA may cause unconsciousness; and a current of 100 mA may be fatal.

A study by the National Bureau of Standards relating to ground fault circuit interrupters in buildings for protection against hazardous shock is in general agreement with the above results. The NBS study states that the resistivity of the skin varies with individuals. When dry, it may be as high as 100,000 to 300,000 ohms/cm, but when wet or broken by a cut, the resistance may be as low as 1% of this value. NBS further states that a value of 500 ohms is considered to be the minimum resistance of the human body between hands or between other major extremities such as hand and foot. This value is frequently used in estimating shock hazard currents in industrial accidents.

The effects of various levels of current on the human body vary greatly. For example, the level at which alternating current stimulates the nerves, indicated by a slight tingling sensation, is termed the "perception current". The mean perception current value for men is 1.1 mA at 60 Hz and the mean value for women is 0.7 mA at 60 Hz.

"Reaction currents" are those currents equal to or slightly greater than perception currents that could produce an involuntary reaction, while a "let-go current" is the maximum current a person can endure and still release the conductor by voluntary muscular control. The maximum uninterrupted, reasonably safe let-go currents are 9 mA for men and 6 mA for women.

Currents at slightly above let-go levels are currents at or a little above those at which a person can "let-go" of a conductor, but below currents causing a ventricular fibrillation (stoppage of heart action) and may contract chest muscles and stop breathing during the period of shock. Normal breathing may resume when the current is interrupted. However, with prolonged application of current, collapse, asphyxia, unconsciousness, and even death may occur in a matter of minutes.

Finally, the deadliest currents are currents causing ventricular fibrillation. The human heart rarely recovers from ventricular fibrillation. Experiments which cause stoppage of heart action and blood circulation cannot be conducted on man. However, data from animal experiments indicates that ventricular fibrillation in normal adults is unlikely if shock intensity is less than 116/T mA, where T is in seconds.

SUMMARY OF THE INVENTION

Accordingly, it is an object of this invention to improve safety and effectiveness in fighting electrical fires.

It is also an object of this invention to provide a fire hose that will decrease the electrical shock hazard to firefighters fighting electrical fires.

These and additional objects of the invention are accomplished by a firehose comprising a hose containing a conductive means throughout the length of said hose with a coupling means at both ends of the hose, said coupling means being electrically attached to said conductive means.

BRIEF DESCRIPTION OF THE DRAWINGS

A more complete appreciation of the invention will be readily obtained by reference to the following Detailed Description of the Invention and the accompanying drawings in which like numerals in different figures represent the same structures or elements, wherein.

DETAILED DESCRIPTION OF THE INVENTION

Figure 1:
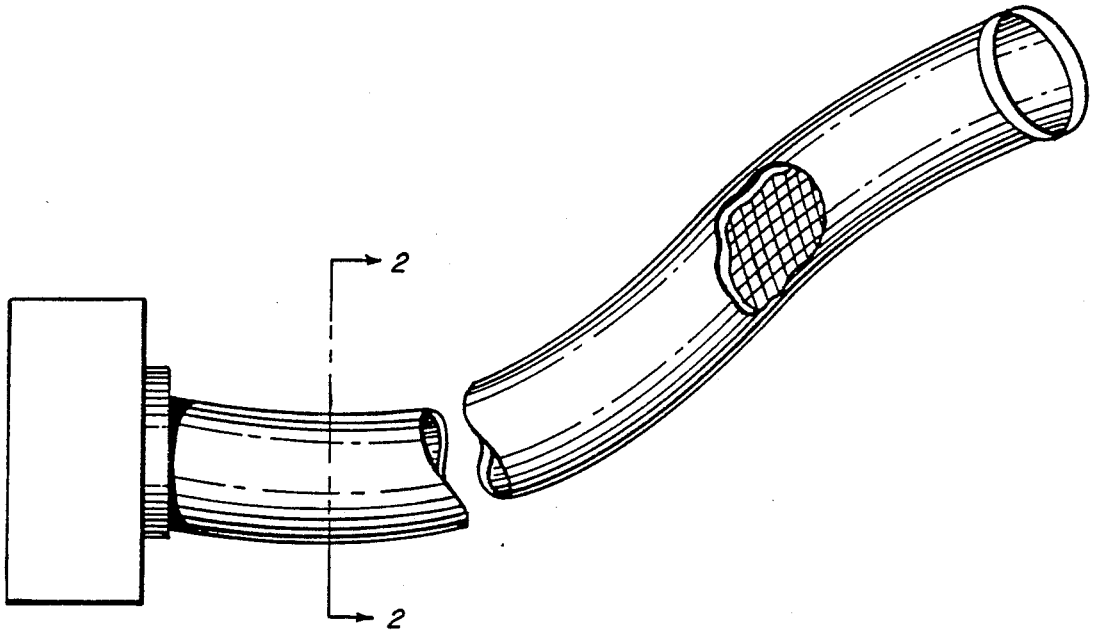
FIG. 1 is a side elevational view of an embodiment of a conductive hose.

An embodiment of the hose of the invention is shown in FIG. 1. It comprises a tubular component (2), a conductive means (4) running the length of the tubular component (2) and couplings (6) at either end of the tubular component (2) which are connected to the conductive means (4). One of the couplings (6) is connected to a ground (8).

The tubular component (2) can be constructed of any material suitable for fire hoses in general, such as rubber or rubber with a cloth or nylon jacket. In addition, the material must also be able to incorporate the conductive means (4). Preferably, the tubular component (2) is constructed of rubber.

The conductive means (4) is crucial to the invention. It acts as an electric "shunt" between the two ends of the tubular component (2). The material used as a conductive means must be conductive and flexible enough to withstand the rigors of rough handling of a firehose without breaking. Generally, the more conductive the material is (i.e. the less resistive) the more preferable it is as a conductive means. The conductive means of the invention must provide a resistance of about one ohm or less, so any material that can provide such a resistance in the invention can be used. Preferably, a material with a resistance of less than about 0.5 ohms is used. As for the material, copper or any material with a low resistance, such as various alloys, are utilized as a conductive means. Copper is preferred.

The material selected for the conductive means (4) must also be in such a form and be placed throughout the length of the tubular component (2) so that the desired resistance (no more than about one ohm) is maintained at all times without adding weight such that the tubular component becomes too heavy and impractical for its use, such as for a fire-fighting tool. In general, any conductive material that when placed throughout the tubular component adds no more than about 5 lbs. per 50 foot length is acceptable. Preferably, the conducting material is in the form of wire strands less than about 25 gauge in size as measured in American Standard Gauge. In this preferred embodiment, the conductive material will generally add less than about 5 lbs per 50 foot length of tubular component, even if more wire strands than necessary are used to obtain the desired resistance.

The number of wire strands required to obtain the desired resistance will, of course, vary depending on the conductive material used, the length, and the size of the tubular component. For example, a 1½ inch hose would require about 10 strands of 20 gauge wire, providing a resistance of less than about 0.07 ohms. Similarly, a 3 inch hose would require about 25 strands of 25 gauge wire, providing a resistance of less than about 0.11 ohms. For other size hoses, wires, and conductive materials, the necessary number of wire strands can easily be calculated. Generally, though, from about 10 to about 20 wire strands of from about 20 to about 25 gauge wire is sufficient. It is preferable to use more wire strands than required to guard against breakage of some wire during normal use of the hose.

Figure 2:
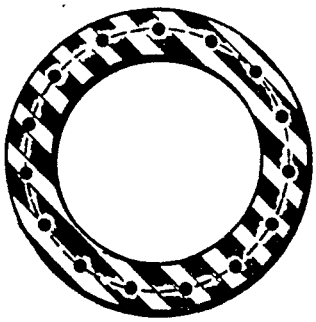
FIG. 2 is a cross-section of the hose taken along the line 2—2 of FIG. 1.

The conductive material can be placed throughout the hose in any configuration, as long as conductivity is maintained throughout the length of the hose. Preferably, the material is in a configuration that both increases the conductivity and strengthens the hose. In the one embodiment where wire is used as the material, the wire is extruded into the hose. Most preferably, the wire is criss-crossed into a mesh type configuration. This is shown in FIG. 2, a cross-section of FIG. 1 at 2—2. The wires (10) should be evenly placed throughout the tubular component (2), as shown in FIG. 2.

The coupling (6) on the tubular component (2) must connect to the conductive means (4) along the tubular component so that an electrical connection is made. Preferably, the coupling (6) is both conductive and corrosion resistant. Most preferably, the coupling (6) is made of brass. As shown in FIG. 1, the coupling is in turn connected at one end to an electrical ground (8).

Having described the invention, the following examples are given to illustrate specific applications of the invention. These specific examples are not intended to limit the scope of the invention described in this application.

EXAMPLE

Figure 3:
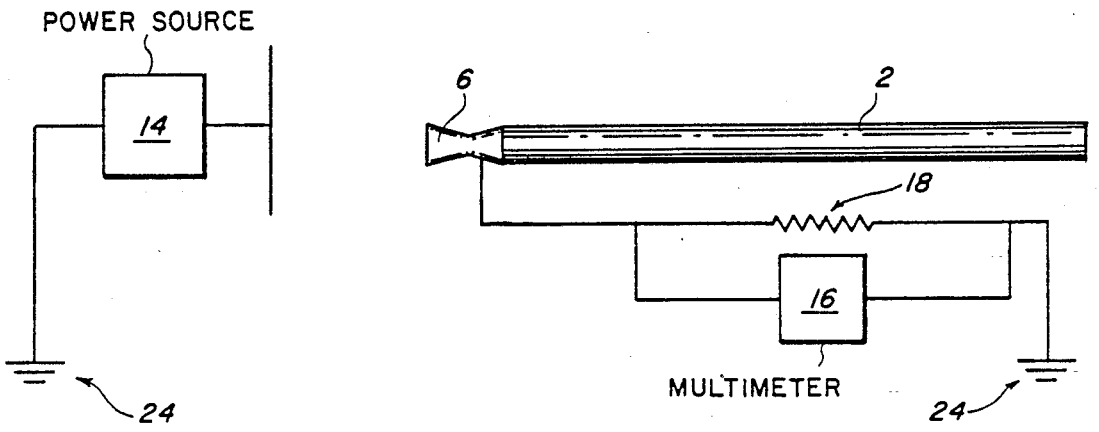
FIG. 3 is a schematic of the experimental setup used for the first set of tests performed.
Figure 4:
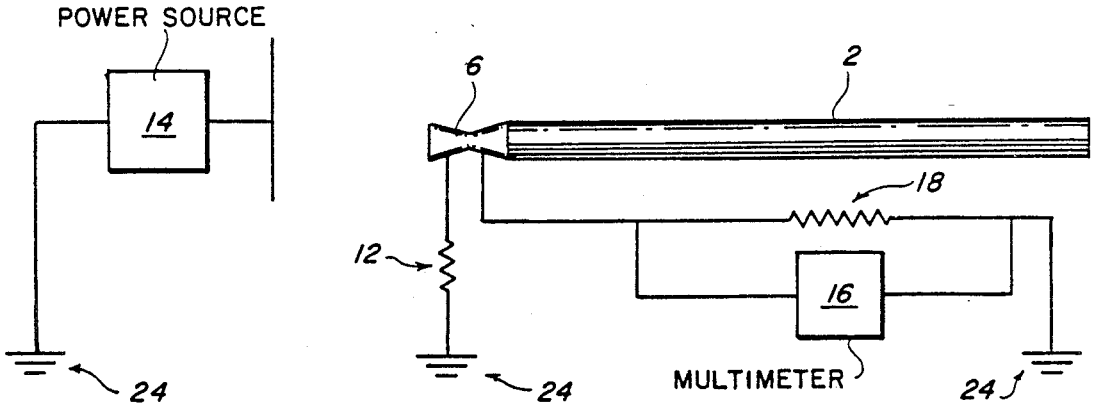
FIG. 4 is a schematic of the experimental setup used for the second set of tests performed.

Two sets of tests were conducted. The first set was conducted without a shunt in place (FIG. 3) and the second set was conducted with the shunt (12) in place (FIG. 4). The shunt (12) consisted of an 18 inch long piece of copper wire test lead, approximately 18 gauge. Each set of tests were repeated at several source voltage levels (from 137 volts to 538 volts) provided by a power source (14), several distances from the source (9" to 3") and using both salt water and fresh (tap) water. Voltages were measured using a Fluke Multimeter Model #8020 (16). A 500 ohm resistor (18) was used to simulate a firefighter - the minimum resistance of the human body. Amps were measured both at the shunt (12) and at the resistor (18) also using Fluke Multimeters. The power source, shunt, and resistor were grounded (24).

The test results were as follows.

TABLE 1

137 VOLT SOURCE USING FRESH WATER

| DISTANCE FROM SOURCE | SHUNT IN OR OUT | VOLTS AT 500 OHM REST. | MILLIAMPS AT 500 OHM REST. | MILLIAMPS AT SHUNT |
|---|---|---|---|---|
| 9" | OUT | 34.0 | 67.1 | — |
| 9" | IN | 0.1 | 0.3 | 88.6 |
| 8" | OUT | 35.0 | 69.9 | — |
| 8" | IN | 0.1 | 0.3 | 96.0 |
| 7" | OUT | 36.5 | 73.6 | — |
| 7" | IN | 0.11 | 0.3 | 100.4 |
| 6" | OUT | 37.5 | 75.0 | — |
| 6" | IN | 0.11 | 0.3 | 103.1 |
| 5" | OUT | 38.0 | 76.6 | — |
| 5" | IN | 0.11 | 0.3 | 106.1 |
| 4" | OUT | 39.0 | 78.3 | — |
| 4" | IN | 0.11 | 0.3 | 109.3 |
| 3" | OUT | 40.0 | 80.7 | — |
| 3" | IN | 0.11 | 0.3 | 114.3 |

TABLE 2

137 VOLT SOURCE USING SALT WATER

| DISTANCE FROM SOURCE | SHUNT IN OR OUT | VOLTS AT 500 OHM REST. | MILLIAMPS AT 500 OHM REST. | MILLIAMPS AT SHUNT |
|---|---|---|---|---|
| 9" | OUT | 71.0 | 144.4 | — |
| 9" | IN | 0.11 | 0.3 | 310.0 |
| 8" | OUT | 74.0 | 150.2 | — |
| 8" | IN | 0.12 | 0.3 | 336.0 |
| 7" | OUT | 76.0 | 154.5 | — |
| 7" | IN | 0.13 | 0.3 | 358.0 |
| 6" | OUT | 77.0 | 157.0 | — |
| 6" | IN | 0.13 | 0.3 | 373.0 |
| 5" | OUT | 78.0 | 159.3 | — |
| 5" | IN | 0.14 | 0.3 | 383.0 |
| 4" | OUT | 80.0 | 161.8 | — |
| 4" | IN | 0.15 | 0.4 | 405.0 |
| 3" | OUT | 82.0 | 164.9 | — |
| 3" | IN | 0.16 | 0.4 | 422.0 |

TABLE 3

238 VOLT SOURCE USING FRESH WATER

| DISTANCE FROM SOURCE | SHUNT IN OR OUT | VOLTS AT 500 OHM REST. | MILLIAMPS AT 500 OHM REST. | MILLIAMPS AT SHUNT |
|---|---|---|---|---|
| 9" | OUT | 57.0 | 115.3 | — |
| 9" | IN | 0.18 | 0.4 | 152.0 |
| 8" | OUT | 61.0 | 122.4 | — |
| 8" | IN | 0.20 | 0.5 | 164.0 |
| 7" | OUT | 63.0 | 125.8 | — |
| 7" | IN | 0.20 | 0.5 | 170.4 |
| 6" | OUT | 64.2 | 130.0 | — |
| 6" | IN | 0.22 | 0.5 | 178.2 |
| 5" | OUT | 65.0 | 132.2 | — |
| 5" | IN | 0.22 | 0.5 | 183.0 |
| 4" | OUT | 67.0 | 135.6 | — |

TABLE 3-continued

238 VOLT SOURCE USING FRESH WATER

| DISTANCE FROM SOURCE | SHUNT IN OR OUT | VOLTS AT 500 OHM REST. | MILLIAMPS AT 500 OHM REST. | MILLIAMPS AT SHUNT |
|---|---|---|---|---|
| 4" | IN | 0.23 | 0.6 | 189.2 |
| 3" | OUT | 70.0 | 141.4 | — |
| 3" | IN | 0.24 | 0.6 | 202.0 |

TABLE 4

238 VOLT SOURCE USING SALT WATER

| DISTANCE FROM SOURCE | SHUNT IN OR OUT | VOLTS AT 500 OHM REST. | MILLIAMPS AT 500 OHM REST. | MILLIAMPS AT SHUNT |
|---|---|---|---|---|
| 9" | OUT | 125.0 | 255.4 | — |
| 9" | IN | 0.23 | 0.6 | 569.0 |
| 8" | OUT | 130.0 | 265.0 | — |
| 8" | IN | 0.25 | 0.6 | 614.0 |
| 7" | OUT | 134.0 | 271.5 | — |
| 7" | IN | 0.26 | 0.6 | 645.0 |
| 6" | OUT | 135.0 | 275.0 | — |
| 6" | IN | 0.29 | 0.6 | 665.0 |
| 5" | OUT | 141.0 | 287.3 | — |
| 5" | IN | 0.31 | 0.7 | 738.0 |
| 4" | OUT | 144.0 | 290.0 | — |
| 4" | IN | 0.35 | 0.7 | 788.0 |
| 3" | OUT | 145.0 | 293.0 | — |
| 3" | IN | 0.38 | 0.8 | 807.0 |

TABLE 5

538 VOLT SOURCE USING FRESH WATER

| DISTANCE FROM SOURCE | SHUNT IN OR OUT | VOLTS AT 500 OHM REST. | MILLIAMPS AT 500 OHM REST. | MILLIAMPS AT SHUNT |
|---|---|---|---|---|
| 9" | OUT | 127.0 | 260.0 | — |
| 9" | IN | 0.12 | 0.29 | 346.0 |
| 8" | OUT | 135.0 | 274.0 | — |
| 8" | IN | 0.14 | 0.31 | 375.0 |
| 7" | OUT | 139.0 | 282.0 | — |
| 7" | IN | 0.15 | 0.32 | 391.0 |
| 6" | OUT | 143.0 | 290.0 | — |
| 6" | IN | 0.16 | 0.33 | 406.0 |
| 5" | OUT | 149.0 | 301.0 | — |
| 5" | IN | 0.18 | 0.35 | 427.0 |
| 4" | OUT | 154.0 | 311.0 | — |
| 4" | IN | 0.19 | 0.41 | 448.0 |
| 3" | OUT | 164.0 | 332.0 | — |
| 3" | IN | 0.21 | 0.42 | 495.0 |

TABLE 6

538 VOLT SOURCE USING SALT WATER

| DISTANCE FROM SOURCE | SHUNT IN OR OUT | VOLTS AT 500 OHM REST. | MILLIAMPS AT 500 OHM REST. | MILLIAMPS AT SHUNT |
|---|---|---|---|---|
| 9" | OUT | 140.0 | 567.0 | — |
| 9" | IN | 0.60 | 1.3 | 1280.0 |

TABLE 6-continued

538 VOLT SOURCE USING SALT WATER

| DISTANCE FROM SOURCE | SHUNT IN OR OUT | VOLTS AT 500 OHM REST. | MILLIAMPS AT 500 OHM REST. | MILLIAMPS AT SHUNT |
|---|---|---|---|---|
| 8" | OUT | 143.0 | 580.0 | — |
| 8" | IN | 0.62 | 1.3 | 1350.0 |
| 7" | OUT | 146.0 | 595.0 | — |
| 7" | IN | 0.67 | 1.35 | 1430.0 |
| 6" | OUT | 151.0 | 611.0 | — |
| 6" | IN | 0.70 | 1.5 | 1518.0 |
| 5" | OUT | 156.0 | 630.0 | — |
| 5" | IN | 0.75 | 1.61 | 1640.0 |
| 4" | OUT | 159.0 | 642.0 | — |
| 4" | IN | 0.82 | 1.76 | 1730.0 |
| 3" | OUT | 165.0 | 667.0 | — |
| 3" | IN | 0.92 | 1.96 | 1915.0 |

The test results recorded on tables 1 through 6 dramatically show the effectiveness of using the shunt. For example, the highest voltage level tested, 538 volts, at the closest distance, 3 inches, showed a current flow of 667 mA through the 500 ohm resistor without using the shunt. This is several times the lethal level of current. Yet, after applying the shunt, the current flow through the 500 ohm resistor dropped to 1.96 mA, well below any hazardous level and just within the perception level. This is a reduction of the current felt by the firefighter by a factor of over 300 times.

Obviously, many modifications and variations of the present invention are possible in light of the above teachings. It is therefore to be understood that within the scope of the appended claims, the invention may be practiced otherwise than as specifically described.

What is claimed is:

1. A conductive firehose comprising:

a tube of a certain length with two ends;

a conductive means for conducting electricity throughout the length of said tube;

a coupling attached to each end of said tube and electrically connected to said conductive means; and conductive means having a resistance of no more than one ohm per 150 foot length of said firehose and being comprised of a flexible conductive material having a weight of less than 15 pounds per 150 foot length of said firehose.

2. A firehose as described in claim 1 wherein the conductive means has a resistance of about 0.5 ohms or less.

3. A firehose as described in claim 1 wherein the conductive material is selected from the group consisting of metal and alloys of metals.

4. A firehose as described in claim 3 wherein the conductive material is copper.

5. A firehose as described in claim 1 wherein the conductive material is in the form of wire strands.

6. A firehose as described in claim 5 wherein the number of wire strands is from between about 10 to 20 and the gauge of the wire strands as measured in American Standard Gauge is from between about 20 to 25.

7. A firehose as described in claim 5 wherein the wire strands run the length of the firehose in a mesh configuration.

8. A firehose as described in claim 1 wherein each coupling is conductive and corrosion resistant.

9. A firehose as described in claim 1 wherein each coupling is brass.

* * * * *